United States Patent [19]
Hansen

[11] 3,791,274
[45] Feb. 12, 1974

[54] ANATOMICAL CAMERA DESIGN

[75] Inventor: David E. Hansen, Fairport, N.Y.

[73] Assignee: Eastman Kodak Company, Rochester, N.Y.

[22] Filed: July 5, 1972

[21] Appl. No.: 268,934

[52] U.S. Cl. .................. 95/11 R, 95/31 R, 352/242
[51] Int. Cl. .......................................... G03b 17/02
[58] Field of Search........ 95/11 R, 31 R, 19, 32, 39; 352/242

[56] References Cited
UNITED STATES PATENTS
| | | | |
|---|---|---|---|
| 2,931,280 | 4/1960 | Belok | 95/11 R |
| 2,778,288 | 1/1957 | Steffen | 95/18 R |
| 2,305,813 | 12/1942 | Ruhnau | 352/242 X |

FOREIGN PATENTS OR APPLICATIONS
| | | | |
|---|---|---|---|
| 687,374 | 2/1953 | Great Britain | 95/11 R |
| 475,371 | 7/1951 | Canada | 95/11 R |
| 274,292 | 3/1951 | Switzerland | 95/11 R |

*Primary Examiner*—Robert P. Greiner

[57] ABSTRACT

A camera employs two mirrors for establishing a folded optical path along which light rays are reflected from a forwardly facing lens to a rearwardly facing photosensitive film surface. The photosensitive film surface, and a gripping portion of a box-like housing containing the film, are oriented below and at an angle to the lens axis such that the light rays are reflected downwardly and forwardly through more than 180° before impinging at right angles on the film surface. This arrangement affords improved camera compactness and facilitates comfortable and steady manipulation of the camera during picture-taking operations by locating the camera gripping surfaces at a natural or comfortable angle for the photographer's hands and wrists.

8 Claims, 6 Drawing Figures

ANATOMICAL CAMERA DESIGN

BACKGROUND OF THE INVENTION

The present invention relates to photography and more particularly to novel means for improving the compactness and operational convenience of photographic cameras.

It is well known in the photographic arts to improve the compactness of non-collapsible cameras by using mirrors or equivalent reflective surfaces for folding the optical path between the lens and the film plane. Generally, an even number of reflective surfaces are employed, to provide a correct image without recourse to special image reversing film. In many instances, two diagonal reflective surfaces are arranged to fold the optical path through 180° so that the optical image is focused onto a rearwardly facing photosensitive film surface that is located in a vertical plane when the camera is held in its customary position to photograph an object along a horizontal object ray path.

A significant disadvantage inherent in most conventional cameras and also in the folded optical path cameras mentioned above is that the box-like camera housing is held in a generally vertical operative position. This position, while stable and reasonably comfortable, is not the most favorable position for the photographer's hands and wrists in order for him to grip the camera firmly and still maintain his upper arms and elbows in contact with his body to achieve maximum steadiness of the camera. A few commercially available cameras have included angularly disposed handles attached to the ends of the camera housing, but such handles are obviously in contradiction to the objective of achieving optimum compactness, and are not especially adaptable to cameras having folded optical paths of long focal length.

SUMMARY OF THE INVENTION

An object of the present invention is to improve the compactness and convenience of operation of photographic cameras of the general type employing a folded optical path.

Another object of the invention is to accomplish the foregoing purposes by means particularly well suited to cameras of the self-processing type.

Still another object of the invention is to achieve such improved compactness and operator convenience by simple and reliable means compatible with economic production and aesthetic camera styling.

Briefly, these and other related objectives are realized in accordance with the present invention in a camera provided with two reflective surfaces establishing a twice folded optical path along which light rays are reflected from a subject forwardly of the camera to a rearwardly facing film surface. The camera includes a relatively thin and generally rectangular box-like housing including a body or gripping section oriented substantially parallel to the film surface, and a head or lens section sloped relative to the body section. Light rays from the subject impinge on one of the reflecting surfaces from a first direction and are reflected downwardly and forwardly through more than 180° before impinging at right angles on the film surface. This arrangement affords improved camera compactness and facilitates comfortable and steady manipulation of the camera by locating its gripping surfaces at a natural angle to the operator's hands and wrists. At the same time, it facilitates a comfortable fit between the camera and the photographer's facial characteristics. Still further, the invention retains the advantages of previously known mirror cameras. Thus, the center of gravity of the camera is located between or near the gripping portions of the operator's hands, the hands engage the camera in opposed relationship at opposite ends of the main housing, and the various camera mechanisms can be located in close proximity to each other for convenient linking and coordination.

Various means for practicing the invention and other advantages and novel features thereof will be apparent from the following detailed description of an illustrative preferred embodiment of the invention, reference being made to the accompanying drawings in which like reference characters denote like elements.

DESCRIPTION OF THE ILLUSTRATIVE PREFERRED EMBODIMENT

Figure 1:
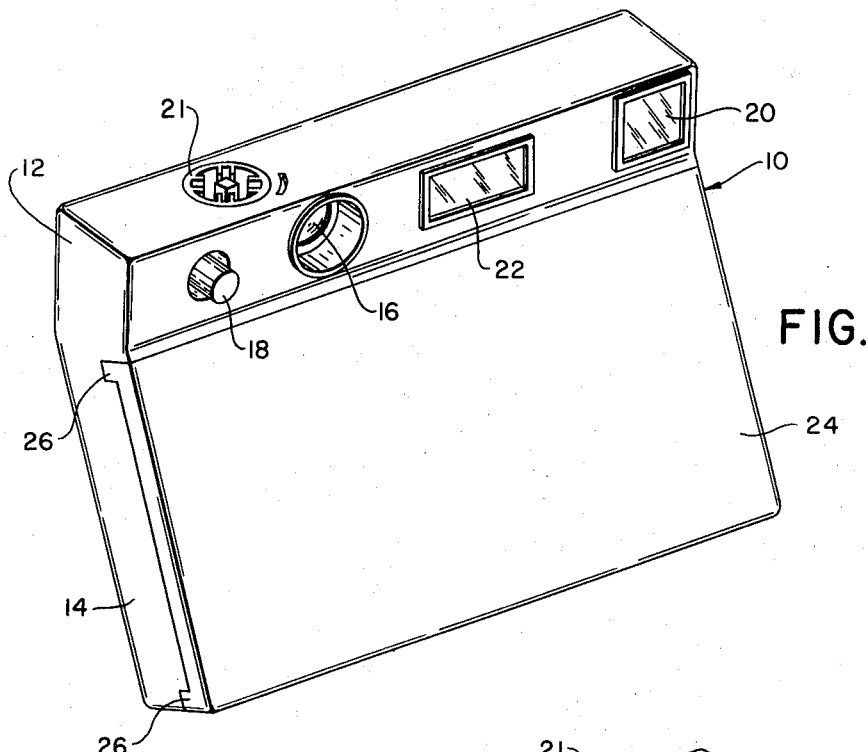
FIG. 1 is a perspective front view of a self-processing camera according to a preferred embodiment of the present invention.

The camera depicted in the accompanying drawings as an illusrative preferred embodiment is of the self-processing type and is provided with a rigid box-like housing 10 comprising an upper portion or head 12 and a lower portion or body 14.

The camera lens 16 is carried by the head of the camera housing, which is oriented vertically when the camera is in its illustrated operative position for photographing an object along a horizontal viewing path. The lens is associated with a conventional shutter and diaphragm assembly, not shown, which is actuated by means of an operating button 18. Also carried by the upper portion of the housing are a viewfinder 20, a flash-receiving structure 21, and the photocell window 22 of an automatic exposure control system, all of which are aligned with parallel operating axes extending perpendicular to the head 12. Preferably, all of the operative components that determine the exposure of the camera film are incorporated within the housing head 12, which can be completely or partially separated from the housing body 14 to facilitate initial assembly and subsequent servicing.

The housing body 14 slopes downwardly and forwardly from head 12 and is provided with a forwardly facing loading door 24 hinged as shown at numeral 26 and held in its closed position by a latch device that is releasable by means of latch slide 28. In the drawings, the body of the camera housing is shown sloped at an angle $\alpha$ of approximately 25° from a vertical plane. The angle α can vary according to different design criteria, but is preferably within the range of 15° to 35° from vertical.

The self-processing film pack or magazine 30 used in the illustrative camera is of the type well known in the prior art, comprising a casing 32 provided with an exposure window 34 and with a film removal slot 36 in its corresponding end wall. A plurality of film units are initially stacked inside the casing behind an opaque masking strip 38 that initially covers the exposure window and extends out of the casing through slot 36. The film units comprise respective leader strips that are connected to each other and to the masking strip in such a way that the withdrawal of the masking strip pulls the leader strip of the first available film unit through slot 36 to an accessible position and the subsequent withdrawal of each successive film unit similarly brings the leader strip of the next film unit to that same position.

To load the film pack into the camera, the hinged loading door 24 is opened and the film pack is inserted into the interior of the housing body with its exposure window 34 facing rearwardly. When the door is closed, it maintains the film pack casing in engagement with various internal support surfaces, wich accurately position the film pack at a predetermined position in parallel relation to the sloped housing body. With the film pack so positioned in the camera, the leading end of the masking strip extends through an exit slot 40 between the adjacent confronting edges of the loading door and the housing. Inside the closed camera body, the masking strip initially extends tends between a rearward pressure roller 42 mounted to the housing and an opposing forward pressure roller 44 carried by door 24. By pulling on the accessible end of the masking strip, the photographer can remove that strip and thereby bring the leader strip of the first available film unit to an accessible position similar to that illustrated in FIGS. 2 and 4. The film sheet of that film unit is thus positioned in a flat plane in exposure window 34 with its photosensitive emulsion surface facing rearwardly in parallel relation to the housing body. After each film unit has been exposed, its accessible leader strip is withdrawn and thereby pulls that unit between the opposed pressure rollers, which rupture a fluid container carried by the film unit and distribute the released processing fluid over the photosensitive sheet in the manner well known in the self-processing camera art.

Figure 2:
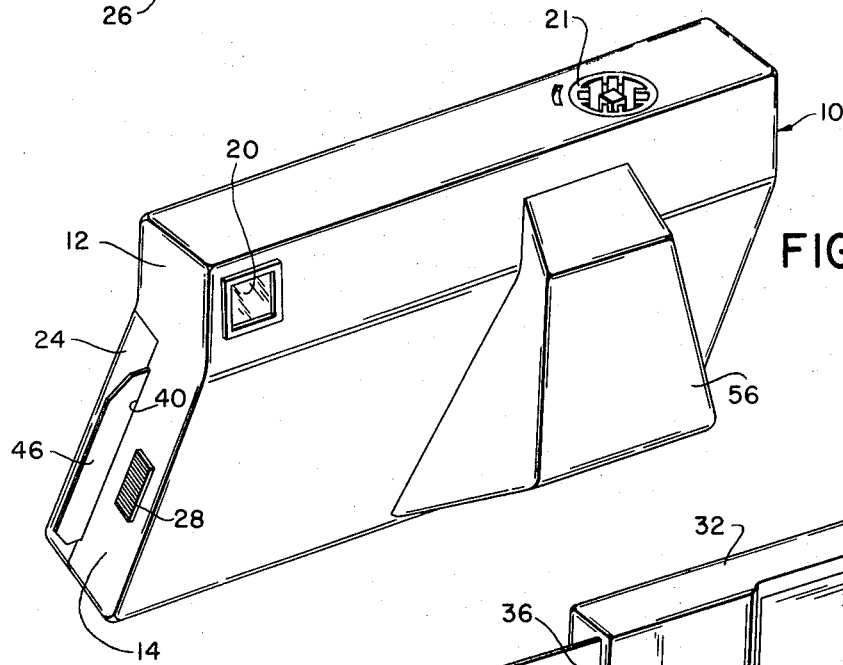
FIG. 2 is a perspective rear view of the camera shown in FIG. 1.
Figure 3:
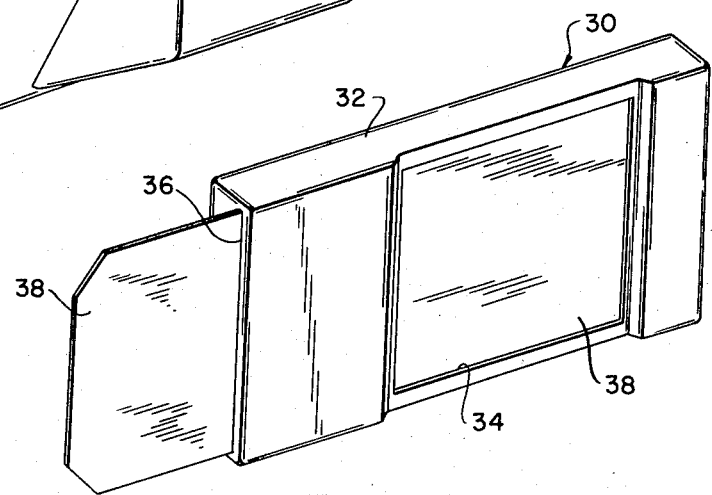
FIG. 3 is a perspective view of the film pack or magazine used in the camera shown in FIGS. 1 and 2.
Figure 4:
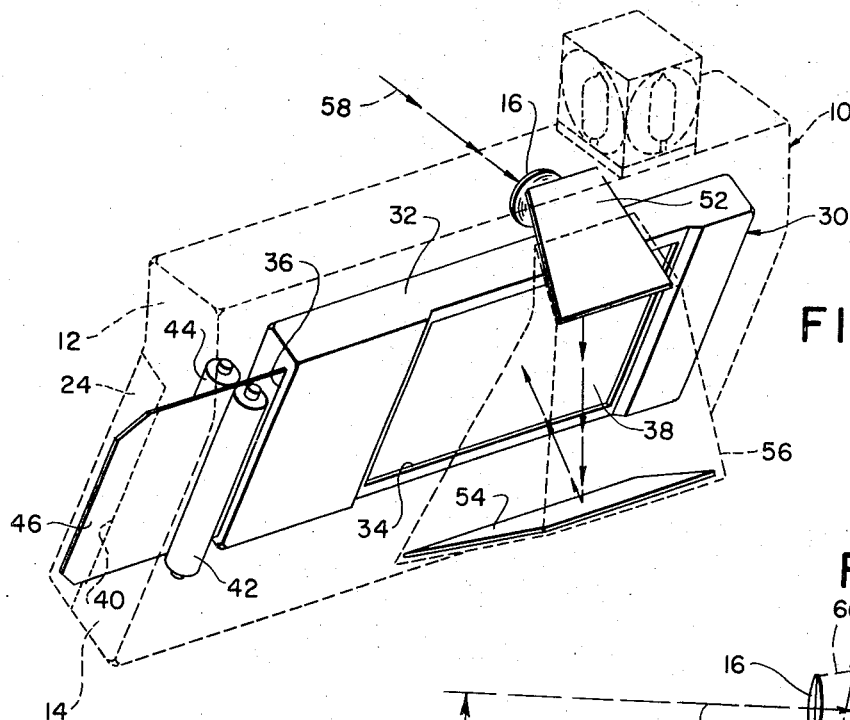
FIG. 4 is a phantom view corresponding to FIG. 2 showing the arrangement of the optical elements and the film pack within the subject camera.
Figure 5:
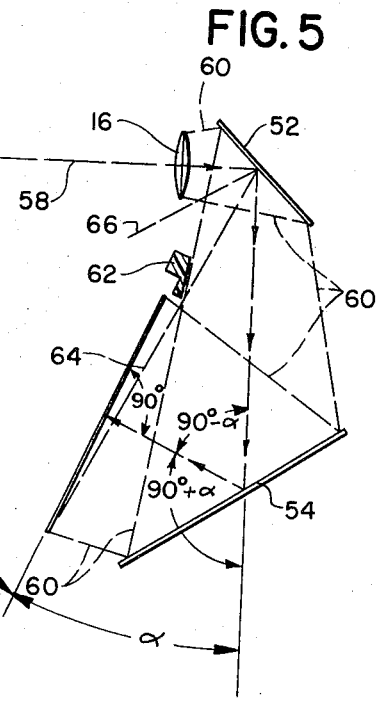
FIG. 5 is a schematic illustration of the optical system of the illustrative camera viewed from one end thereof.

The novel optical system of the camera includes two angularly disposed mirrors 52 and 54 housed within a rigid light-tight enclosure 56 that extends rearwardly from the camera housing as best shown in FIGS. 2 and 4. The upper mirror 52 is located behind the camera lens 16 to reflect the image downwardly to the lower mirror 54, which in turn reflects the image onto the photosensitive film surface in optical coincidence with the flat focal plane of the camera lens. To conserve space by allowing enclosure 56 to be as small as possible, the mirrors are trapezoidal in shape, corresponding to their respective planes of intersection with the pyramidal optical ray bundle between the lens and the rectangular film plane. By reference to FIG. 5, it will be seen that the central or principal or primary optical ray 58 is thus reflected or folded through an angle of approximately 205° because of the 25° angle of α of the film plane relative to the vertical plane of the camera head. That is to say, ray 58 is first folded at mirror 52 through an angle of 90° and is then folded further at mirror 54 through an angle of 90° plus α, for a total fold angle of 180° plus α. When α is 25°, the total fold angle is 205°. If α is changed, for example, to some other value within the preferred range of 15° to 35° the total fold angle changes to a commensurate value, for example, within the corresponding range of 195° to 215° degrees. With ray 58 so folded, the housing of the camera can be made significantly more compact than if the mirrors were adapted to fold the primary ray of a similar optical system through only 180°, as in the case of the previously mentioned prior art cameras. The sizes and positions of the two mirrors in FIGS. 4 and 5 do not necessarily provide optimum compactness, but illustrate a realistic optical arrangement for a camera with a lens aperture of approximately f/8. In designing any such mirror arrangement, the mirrors obviously must be oriented according to the well known optical law of equal angles of incidence and reflectance and must avoid any physical obstruction along the pyramidal ray space designated by broken lines 60 in FIG. 5. Also, it is essential that the film plane cannot receive light reflected directly to the film from the lens by the mirror 52 alone. In FIG. 5, for example, a baffle 62 is provided within the camera housing just beyond the ray space between mirrors 52 and 54 such that broken line 64 represents the most nearly vertical ray that can reach the film directly from mirror 52 in the illustrated plane of the camera. The continuation or reflection of this ray, shown at numeral 66, passes below the camera lens and the corresponding continuation of any other ray extending directly between the film plane and mirror 52 will pass the lens at an even greater distance. Accordingly, the only light from the lens that can be received by the film is that which is reflected by both mirrors. Actually, it is not essential that ray 66 miss the lens entirely, as long as that ray cannot coincide with any ray emitted from the lens. However, the illustrated arrangement provides for absolute avoidance of spurious film exposure from this cause and also allows a margin of latitude for the use of supplemental lenses or an adjustable focus lens.

Figure 6:
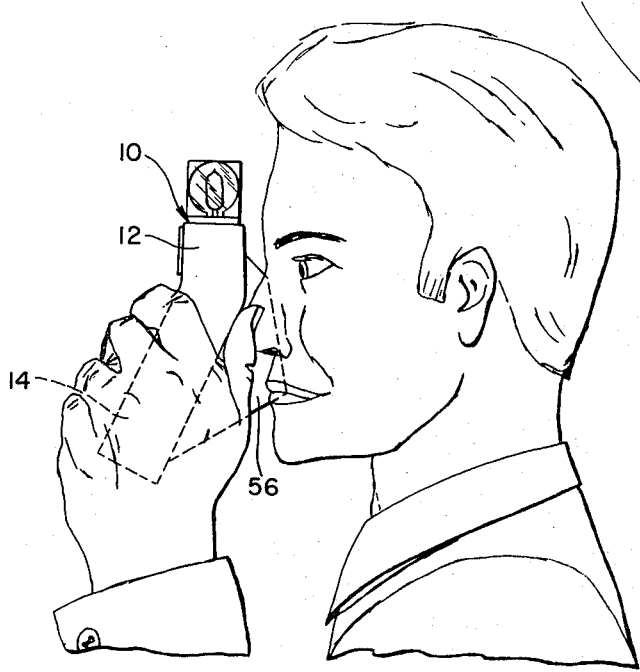
FIG. 6 depicts a photographer holding the subject camera in its customary operative position.

In order to hold a camera as steadily as possible in its operative position, experience has shown that the photographer should grip the camera firmly against the palms of his hands and should keep his upper arms pressed to his chest as opposed to having his elbows extended outwardly from his body. In this recommended position, the photographer's forearms are substantially vertical when he is taking a photograph of an object generally on the same level as his eyes. This means that his wrists must be bent forwardly at an uncomfortable angle in order for him to grip the ends of a conventional vertical camera housing. Because of the sloped body portion of the subject camera, however, the photographer's wrists can remain in a substantially straight comfortable position, as illustrated in FIG. 6, thus minimizing muscular fatigue and tremor to assure optimum steadiness. At the same time, the sloped camera body facilitates a comfortable fit between the camera and the facial characteristics of the average photographer. As previously mentioned, the particular angle of slope α of the camera body can be modified from that of the illustrative embodiment, but should preferably be within the range of 15° to 35° from vertical when the camera is in its illustrated operative position.

Although the illustrative camera employs two reflective surfaces located along the optical path behind the camera lens, it would also be possible to position the lens or an element thereof between the reflective surfaces, particularly if a shorter focal length lens were desired. Alternatively, the lens theoretically could be eliminated entirely by employing spherical or parabolic mirrors to focus the photographic image onto the film. Furthermore, the mirror enclosure could be made collapsible by hinging one or both of the mirrors and by allowing the side and back panels of the enclosure to flex in bellows fashion.

The invention has been described in detail with particular reference to an illustrative preferred embodiment thereof, but it will be understood that variations and modifications can be effected within the spirit and scope of the invention as described hereinabove and as defined in the appended claims.

I claim:

1. A camera for receiving film having a surface adapted to be exposed for recording a latent image in the film, said camera comprising:
   a housing;
   means for establishing a film plane within said housing;
   means defining first and second reflective surfaces angularly disposed within said housing for folding a principal optical ray generally downwardly and forwardly from a first direction, in which the principal ray first strikes said first reflective surface, through an angle of from 195° to 215°, to a second direction normal to said film plane for establishing a focused image at said film plane; and
   means for supporting the film in said housing with the film surface to be exposed facing generally rearwardly in coincidence with said film plane.

2. A camera as claimed in claim 1 including an objective lens located forwardly of said first reflective surface to provide the focused image at said film plane.

3. A camera as claimed in claim 1 wherein said first and second reflective surfaces are provided by respective first and second mirrors.

4. A camera as claimed in claim 1 wherein said housing includes a box-like body section enclosing said film supporting means, said body section being oriented in substantially parallel relationship to said film plane to provide external gripping surfaces oriented at an angle of from 55° to 75° relative to said first direction.

5. A camera as claimed in claim 4 wherein said first and second reflective surfaces define corresponding portions of an optical path, wherein said body section includes a center portion and end portions thereof, and wherein said housing includes a light-tight enclosure projecting rearwardly from said body section and surrounding the corresponding portions of the optical path defined by said reflective surfaces, said enclosure being narrower than said body section and located toward said center portion whereby said end portions are accessible to provide gripping surfaces by which said camera can be supported in an operative position 6. A compact camera for exposing film in a film plane to radiation including a principal ray, said camera comprising:
   an optical system including means for folding the principal ray by more than 180° and less than 270° in a single plane from a first direction, in which the principal ray first impinges on said folding means, to a second direction, said folding means including two reflecting surfaces configured and arranged to fold the principal ray through an angle of from 195° to 215°; and
   means for receiving the film and for establishing the film plane in an orientation wherein the principal ray when in the second direction impinges on the film at right angles thereto.

7. A compact camera for exposing film in a film plane to radiation including a principal ray, said camera comprising:
   an optical system including means for folding the principal ray by more than 180° and less than 270° in a single plane from a first direction, in which the principal ray first impinges on said folding means, to a second direction, said folding means including two reflecting surfaces configured and arranged to fold the principal ray through an angle of approximately 205°; and
   means for receiving the film and for establishing the film plane in an orientation wherein the principal ray when in the second direction impinges on the film at right angles thereto.

8. A compact photographic camera for exposing film to light focused thereon from a subject, said camera comprising:
   a generally rectangular and relatively flat body section for receiving the film and for establishing a film plane at which the light from the subject is to be focused;
   a head section including a lens having an optical axis, a viewfinder establishing a viewing axis, and a flash receiving structure determining a principal axis for flash illumination, said optical axis, said viewing axis, and said principal axis extending in substantially the same direction at an angle of from 75° to 55° from said film plane; and
   a pair of reflecting surfaces for folding a principal ray of the light from the subject in a single plane through more than 180° from said optical axis to said film plane, said reflecting surfaces being configured and arranged to fold the principal ray through an angle of from 195° to 215°.

* * * * *